United States Patent
Hoshuyama

(10) Patent No.: US 9,961,511 B2
(45) Date of Patent: May 1, 2018

(54) POSITION DETECTION SYSTEM, METHOD THEREFOR, AND COMPUTER-READABLE MEDIUM

(71) Applicant: NEC Corporation, Tokyo (JP)

(72) Inventor: Osamu Hoshuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 171 days.

(21) Appl. No.: 14/960,550

(22) Filed: Dec. 7, 2015

(65) Prior Publication Data
US 2016/0165467 A1 Jun. 9, 2016

(30) Foreign Application Priority Data

Dec. 9, 2014 (JP) .................................. 2014-249224

(51) Int. Cl.
*G06F 11/00* (2006.01)
*H04J 1/16* (2006.01)
(Continued)

(52) U.S. Cl.
CPC ............. *H04W 4/06* (2013.01); *G01S 5/0081* (2013.01); *G01S 5/18* (2013.01); *G01S 5/22* (2013.01); *H04W 4/025* (2013.01); *H04W 64/00* (2013.01)

(58) Field of Classification Search
CPC ....... H04W 4/06; H04W 64/00; H04W 4/025; G01S 5/22; G01S 5/18; G01S 5/0081
(Continued)

(56) References Cited

U.S. PATENT DOCUMENTS 7,558,583 B2 * 7/2009 Ledeczi .................... G01S 5/14
455/1
7,936,162 B2 * 5/2011 Tsuda ................. G01R 13/0272
324/76.19
(Continued)

FOREIGN PATENT DOCUMENTS

CN 1854760 A 11/2006
EP 1 717 597 A2 11/2006
(Continued)

OTHER PUBLICATIONS

Written Opinion and Search Report issued by the Japanese Patent Office dated Feb. 23, 2016, in counterpart International Patent Application No. PCT/JP2015/082898.

*Primary Examiner* — Chuong T Ho
(74) *Attorney, Agent, or Firm* — Finnegan, Henderson, Farabow, Garrett & Dunner, L.L.P.

(57) ABSTRACT

A position detection system, including a memory storing instructions, and at least one processor configured to process the instructions to receive measured waveform signals sent out from an object to be measured via a first sensor and a second sensor, receive the broadcasting radio wave signals sent out from the first sensor and the second sensor, separate the measured waveform signals and the broadcasting radio wave, for each sensor, estimate an offset between the sampling frequencies of the measured waveform signal of the first sensor and the measured waveform signal of the second sensor based on the broadcasting radio wave signals respectively sent out from the first sensor and the second sensor, correct the measured waveform signal sent out from the second sensor based on the estimated offset between the sampling frequencies, and detect a position of the object to be measured based on the measured waveform signal sent out from the first sensor and a signal obtained by correcting (Continued)

the measured waveform signal sent out from the second sensor.

14 Claims, 13 Drawing Sheets

(51) Int. Cl.
*H04L 1/00* (2006.01)
*H04L 12/26* (2006.01)
*H04W 4/06* (2009.01)
*H04W 4/02* (2018.01)
*H04W 64/00* (2009.01)
*G01S 5/00* (2006.01)
*G01S 5/18* (2006.01)
*G01S 5/22* (2006.01)

(58) Field of Classification Search
USPC .......................... 370/331, 338, 342, 252, 254
See application file for complete search history.

(56) References Cited

U.S. PATENT DOCUMENTS

| 8,195,416 B2* | 6/2012 | Tsuda ................... G01R 23/20 |
| | | 702/189 |
| 2006/0239121 A1 | 10/2006 | Kong et al. |
| 2007/0042706 A1* | 2/2007 | Ledeczi .................... G01S 5/14 |
| | | 455/3.01 |
| 2012/0122485 A1* | 5/2012 | Bartlett ................ G01S 5/0284 |
| | | 455/456.1 |
| 2016/0066157 A1* | 3/2016 | Noorshams .......... G01C 21/206 |
| | | 455/457 |

FOREIGN PATENT DOCUMENTS

| JP | 6-204798 | 7/1994 |
| JP | 10-90106 | 4/1998 |
| JP | 2005-69892 | 3/2005 |
| JP | 2006-300953 | 11/2006 |
| KR | 2006-0110978 | 10/2006 |
| WO | WO 2011/090110 A1 | 7/2011 |

* cited by examiner

POSITION DETECTION SYSTEM, METHOD THEREFOR, AND COMPUTER-READABLE MEDIUM

CROSS-REFERENCE TO RELATED PATENT APPLICATIONS

This application is based upon and claims the benefit of priority from Japanese Patent Application No. 2014-249224, filed on Dec. 9, 2014. The entire disclosure of the above-referenced application is incorporated herein by reference.

TECHNICAL FIELD

The present disclosure generally relates to a position detection system, a method therefor, and a computer-readable medium.

BACKGROUND

In the above-described technical field, there may be a leakage position searching device that measures the presence or absence of a leakage and the position of the leakage in consideration of the correlation between leakage sounds measured by individual leakage sound detectors. In some aspects, the leakage position searching device may receive leakage sounds and radio waves by the individual leakage sound detectors, and establish synchronization regarding the leakage sounds using the received radio waves.

In some aspects, the related technologies is not precisely establish synchronization regarding leakage sounds in a case where there is a difference between the sampling frequencies of two received signals, so that a required sound output position cannot be precisely measured.

SUMMARY

Exemplary embodiments of the present disclosure overcome the above disadvantages and other disadvantages not described above. Also, the present exemplary embodiments are not required to overcome the disadvantages described above, and an exemplary embodiment of the present disclosure is not overcome any of the problems described above.

According to an aspect of the present disclosure, a position detection system is disclosed. The position detection system may include a first sensor and a second sensor each of which include a first memory storing instructions, and at least one first processor configured to process the instructions to receive a broadcasting radio wave signal and a measured waveform signal sent out from a object to be measured, and store and transmit the broadcasting radio wave signal and the measured waveform signal, and a position detection apparatus which includes a second memory storing instructions, and at least one second processor configured to process the instructions to receive the broadcasting radio wave signal and the measured waveform signal transmitted from the first sensor and the second sensor, separate the broadcasting radio wave signal and the measured waveform signal, for each of the first sensor and the second sensor, estimate an offset between the sampling frequencies of the measured waveform signal of the first sensor and the measured waveform signal of the second sensor based on the broadcasting radio wave signals respectively received by the first sensor and the second sensor, correct the measured waveform signal transmitted from the second sensor based on the estimated offset between the sampling frequencies, and detect the position of the object to be measured based on the measured waveform signal transmitted from the first sensor and a signal obtained by correcting the measured waveform signal transmitted from the second sensor.

According to another aspect of the present disclosure, a position detection system is disclosed. The system may include a memory storing instructions, and at least one processor configured to process the instructions to receive measured waveform signals sent out from an object to be measured via a first sensor and a second sensor, receive the broadcasting radio wave signals sent out from the first sensor and the second sensor, separate the measured waveform signals and the broadcasting radio wave, for each sensor, apply a correction method to the measured waveform signal sent out from the second sensor, the correction method being a method in which the broadcasting radio wave signal sent out from the second sensor is corrected so as to be equal to the broadcasting radio wave signal sent out from the first sensor, and detect a position of the object to be measured based on the measured waveform signal sent out from the first sensor and a corrected measured waveform signal sent out from the second sensor.

According to yet another aspect of the present disclosure, a position detection system is disclosed. The system may include a memory storing instructions, and at least one processor configured to process the instructions to receive measured waveform signals sent out from an object to be measured via a first sensor and a second sensor, receive the broadcasting radio wave signals sent out from the first sensor and the second sensor, separate the measured waveform signals and the broadcasting radio wave, for each sensor, estimate an offset between the sampling frequencies of the measured waveform signal of the first sensor and the measured waveform signal of the second sensor based on the broadcasting radio wave signals respectively sent out from the first sensor and the second sensor, correct the measured waveform signal sent out from the second sensor based on the estimated offset between the sampling frequencies, and detect a position of the object to be measured based on the measured waveform signal sent out from the first sensor and a signal obtained by correcting the measured waveform signal sent out from the second sensor.

According to yet another aspect of the present disclosure, a position detection method is disclosed. The method may include receiving measured waveform signals sent out from an object to be measured via a first sensor and a second sensor, receiving the broadcasting radio wave signals sent out from the first sensor and the second sensor, separating the measured waveform signals and the broadcasting radio wave, for each sensor, estimating an offset between the sampling frequencies of the measured waveform signal of the first sensor and the measured waveform signal of the second sensor based on the broadcasting radio wave signals respectively sent out from the first sensor and the second sensor, correcting the measured waveform signal sent out from the second sensor based on the estimated offset between the sampling frequencies, and detecting a position of the object to be measured based on the measured waveform signal sent out from the first sensor and a signal obtained by correcting the measured waveform signal sent out from the second sensor.

According to yet another aspect of the present disclosure, a non-transitory computer-readable storage medium having stored thereon instructions that when executed by a computer enable the computer to implement a method is disclosed. The method may include receiving measured waveform signals sent out from an object to be measured via a first sensor and a second sensor, receiving the broadcasting radio wave signals sent out from the first sensor and the second sensor, separating the measured waveform signals and the broadcasting radio wave, for each sensor, estimating an offset between the sampling frequencies of the measured waveform signal of the first sensor and the measured waveform signal of the second sensor based on the broadcasting radio wave signals respectively sent out from the first sensor and the second sensor, correcting the measured waveform signal sent out from the second sensor based on the estimated offset between the sampling frequencies, and detecting a position of the object to be measured based on the measured waveform signal sent out from the first sensor and a signal obtained by correcting the measured waveform signal sent out from the second sensor.

DETAILED DESCRIPTION

The following description of illustrative, non-limiting embodiments discloses specific configurations, components, and processes. However, the embodiments are merely examples, and thus, the specific features described below are merely used to more easily describe such embodiments and to provide an overall understanding. Accordingly, one skilled in the art will readily recognize that the disclosed embodiments are not limited to the specific embodiments described below. Furthermore, the descriptions of various configurations, components, and processes of the embodiments that would have been known to one skilled in the art are omitted for the sake of clarity and brevity.

In some aspects, a "sound signal" in the following descriptions may be a direct electric change that is caused by a sound or other acoustic phenomena and that transmits the sound and the other acoustic phenomena. In some aspects, a "sound signal" is not limited to an electric change caused by only a sound.

First Example

An information processing system 100 according to a first example of the present disclosure will be described with reference to FIG. 1. The information processing system 100 may be a system for detecting the position of an object to be measured 120.

Figure 1:
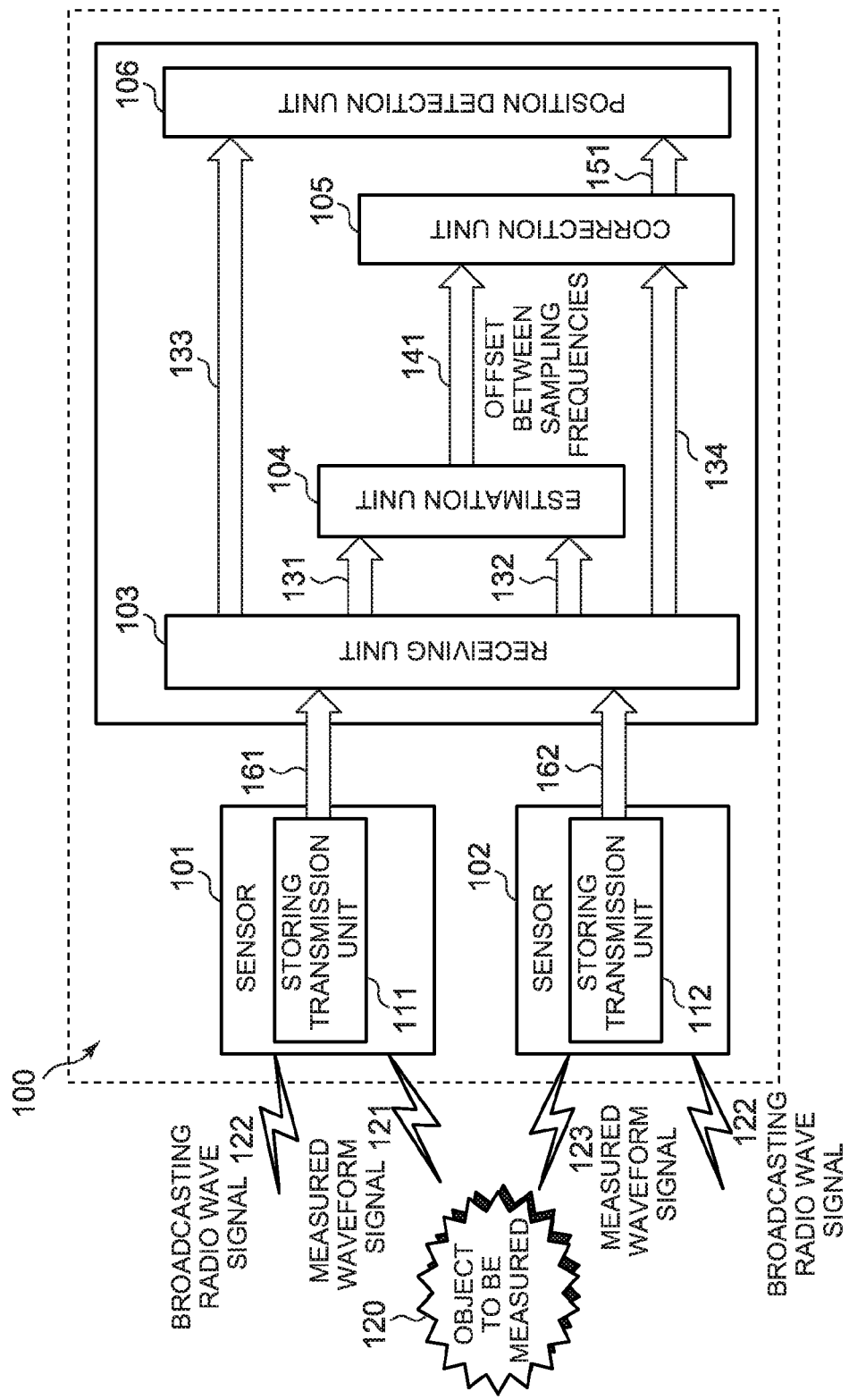
FIG. 1 is a block diagram illustrating the configuration of a position detection system according to embodiments of the present disclosure.

As illustrated in FIG. 1, the information processing system 100 may include a sensor 101, a sensor 102, a receiving unit 103, an estimation unit 104, a correction unit 105, and a position detection unit 106.

The sensor 101 may be a sensor including a storing/transmission unit 111 that receives a measured waveform signal 121 sent out from the object to be measured 120 and a broadcasting radio wave signal 122. The storing/transmission unit 111 may store and transmit the measured waveform signal 121 and the broadcasting radio wave signal 122.

The sensor 102 may be a sensor including a storing/transmission unit 112 that receives a measured waveform signal 123 sent out from the object to be measured 120 and a broadcasting radio wave signal 122. The storing/transmission unit 112 may store and transmit the measured waveform signal 123 and the broadcasting radio wave signal 122.

The receiving unit 103 may receive the signal 161 transmitted from the storing/transmission unit 111 of the sensor 101 and the signal 162 transmitted from the storing/transmission unit 112 of the sensor 102. The receiving unit 103 may separate the received signals, for each sensor which transmits at least one of the received signals, into a broadcasting radio wave signal 131 and a measured waveform signal 133, and a broadcasting radio wave signal 132 and a measured waveform signal 134.

The estimation unit 104 may estimate an offset 141 between the sampling frequencies of the measured waveform signal 133 of the sensor 101 and the measured waveform signal 134 of the sensor 102 on the basis of the broadcasting radio wave signals 131 and 132 respectively received by the sensors 101 and 102.

The correction unit 105 may correct the measured waveform signal 134 transmitted from the sensor 102 on the basis of the estimated offset 141 between the sampling frequencies.

The position detection unit 106 may detect the position of the object to be measured 120 on the basis of the measured waveform signal 133 transmitted from the sensor 101 and a signal 151 obtained by the correction unit 105 correcting the measured waveform signal 134 transmitted from the sensor 102.

In some aspects, two sensors 101 and 102 may be used in this example. In other aspects, the present disclosure is not limited to a system including two sensors. In other aspects, signals received by sensors are not limited to sound signals, and any vibration waveform signals that are received by sensors may be used.

Because the deviations (e.g., drifts, offsets) among the sampling frequencies of individual sensors can be corrected owing to the above-described configuration, the position of a object to be measured can be precisely measured.

Second Example

Figure 2:
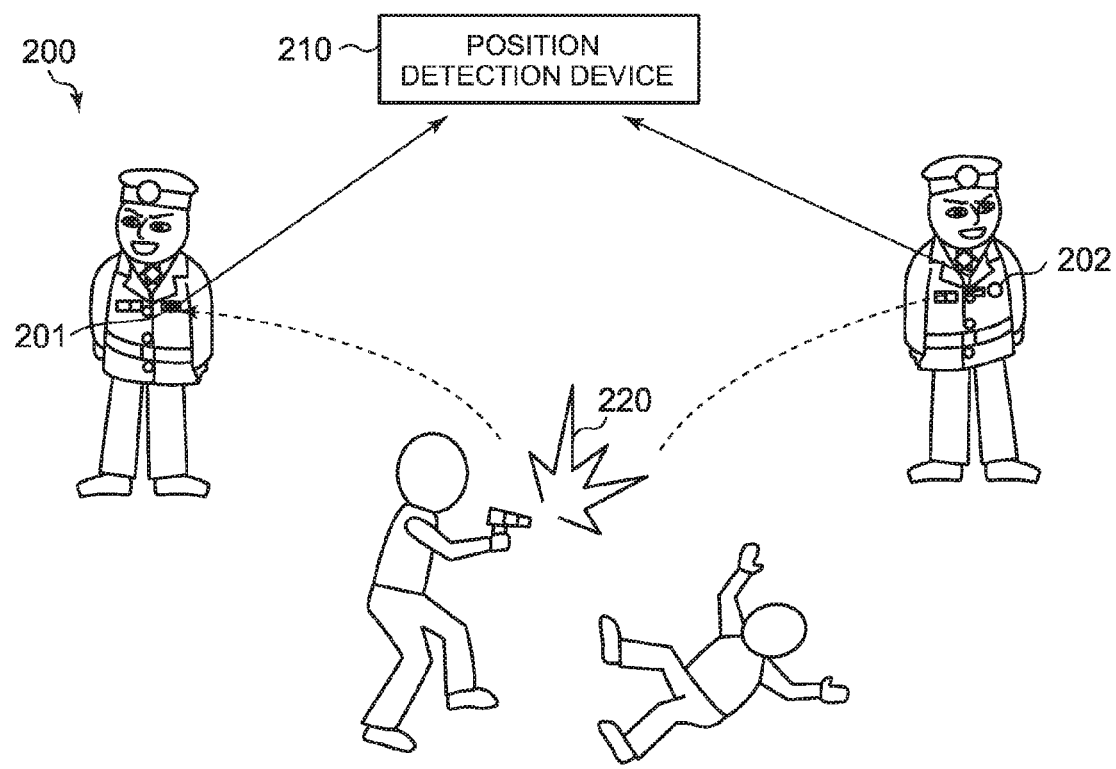
FIG. 2 is a diagram illustrating an example of a usage aspect of a position detection system according to embodiments of the present disclosure.

A position detection system according to a second example of the present disclosure will be described with reference to FIG. 2 and the following drawings. FIG. 2 is a diagram illustrating an example of a usage aspect of the position detection system according to embodiments of the present disclosure. FIG. 2 is a figure illustrating that two respective guards have sound detection sensors 201 and 202. If none of the guards are present on-site and if the sound detection sensors 201 and 202 detect a gunshot, the position detection device 210 may determine the position of the gunshot 220 and the direction in which the footsteps of a suspect are generated. Because the respective guards move bringing the sound detection sensors 201 and 202 with them, an offset between the sampling frequencies may become larger in this case in comparison with a case where these sensors are fixed. Therefore, in order to estimate the position of the sound source as precisely as possible, it may become necessary to perform not only correction for matching the start times of clocks, but also more precise clock correction, that is, correction of the offset between the sampling frequencies. This may be because a small deviation between clocks brings about a large position estimation error in a case where the position of a sound source is estimated. In some aspects, in a case where both sound source and sensors are moving, although the velocity of the sensors can be estimated using a gyroscope or the like, the moving velocity of the sound source may have to be estimated using the Doppler Effect. The Doppler Effect and the deviation between clocks may bring about equivalent phenomena that appear in a receiving signal. In some aspects, these phenomena are not estimated or corrected at the same time. In order to estimate the Doppler Effect, it may be needed to sequentially perform precise sampling correction.

Figure 3:
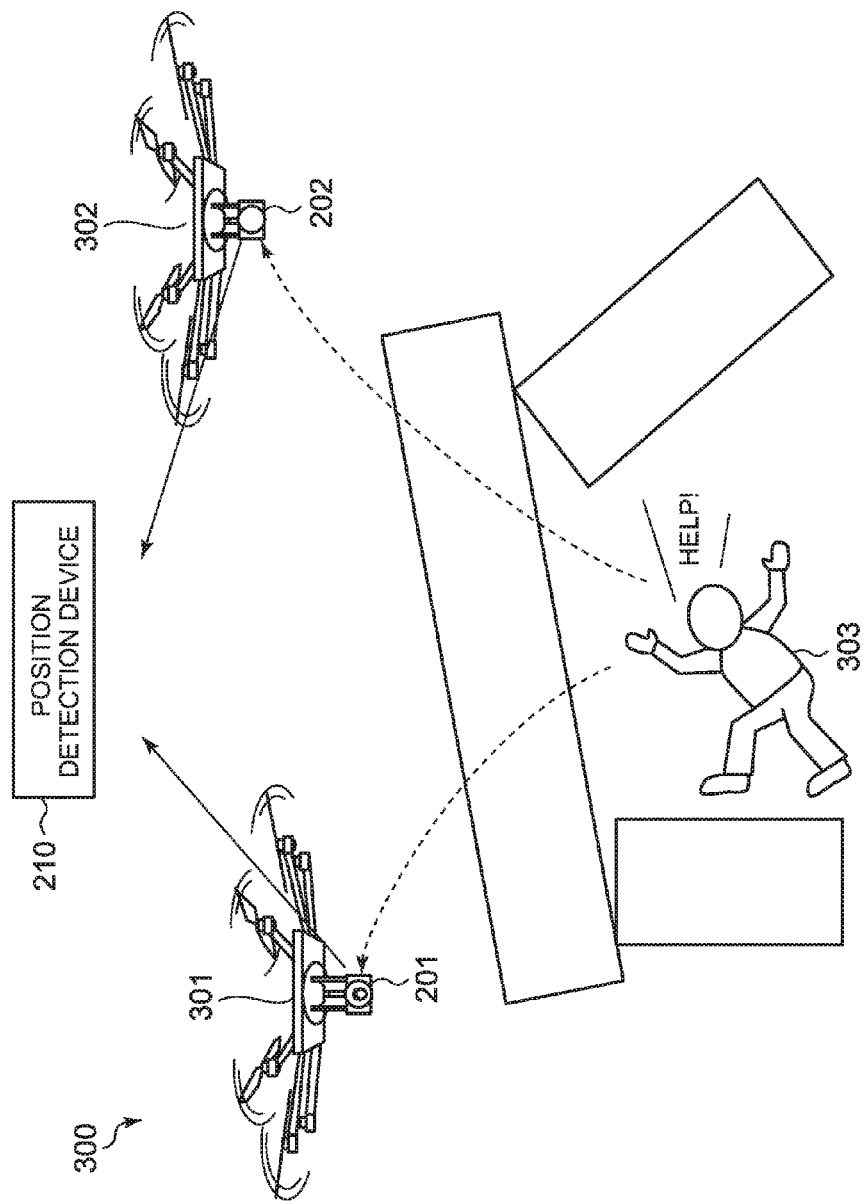
FIG. 3 is a diagram illustrating another example of a usage aspect of the position detection system according to embodiments of the present disclosure.

FIG. 3 is a diagram illustrating another example of a usage aspect of the position detection system 300 according to embodiments of the present disclosure. At a disaster site which a person cannot enter, respective flying unmanned helicopters 301 and 302 each of which include the sound detection sensors 201 and 202, may check the presence or absence of a survivor in need of help 303 and detect the position of the survivor in need of help 303, using the position detection device 210. The position detection system 300 may detect only the voice of the survivor in need of help 303 and measure the accurate position of the survivor in need of help 303 by suppressing the mechanical noises and whistling sounds of the helicopters by means of sound processing. In this case, because the sensors 201 and 202 are not fixed, it may become necessary to perform not only correction for matching the start times of the clocks of the respective sensors but also correction of the offset between the sampling frequencies.

Because the sampling is corrected at each point, time correction may be performed with precision needed by correlation processing and synchronous addition executed by an array. Highly precise sampling synchronization needed by adaptive filtering and the like may be performed. Individual sensor modules may be easily configured and these sensor modules do not require high clock precision, therefore sensors may be provided with high production efficiency.

Figure 4:
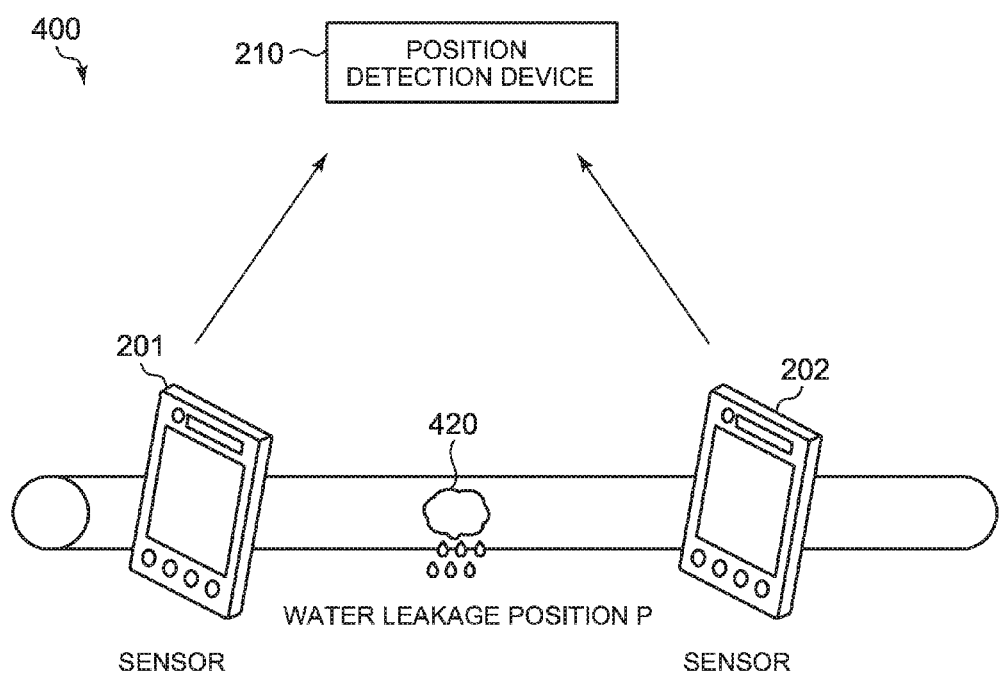
FIG. 4 is a diagram illustrating another example of a usage aspect of the position detection system according to embodiments of the present disclosure.

This example may be applied to a water leakage position detection system for detecting a water leakage position 420 using the sensors 201, 202, and the position detection device 210 as illustrated in FIG. 4

Figure 5:
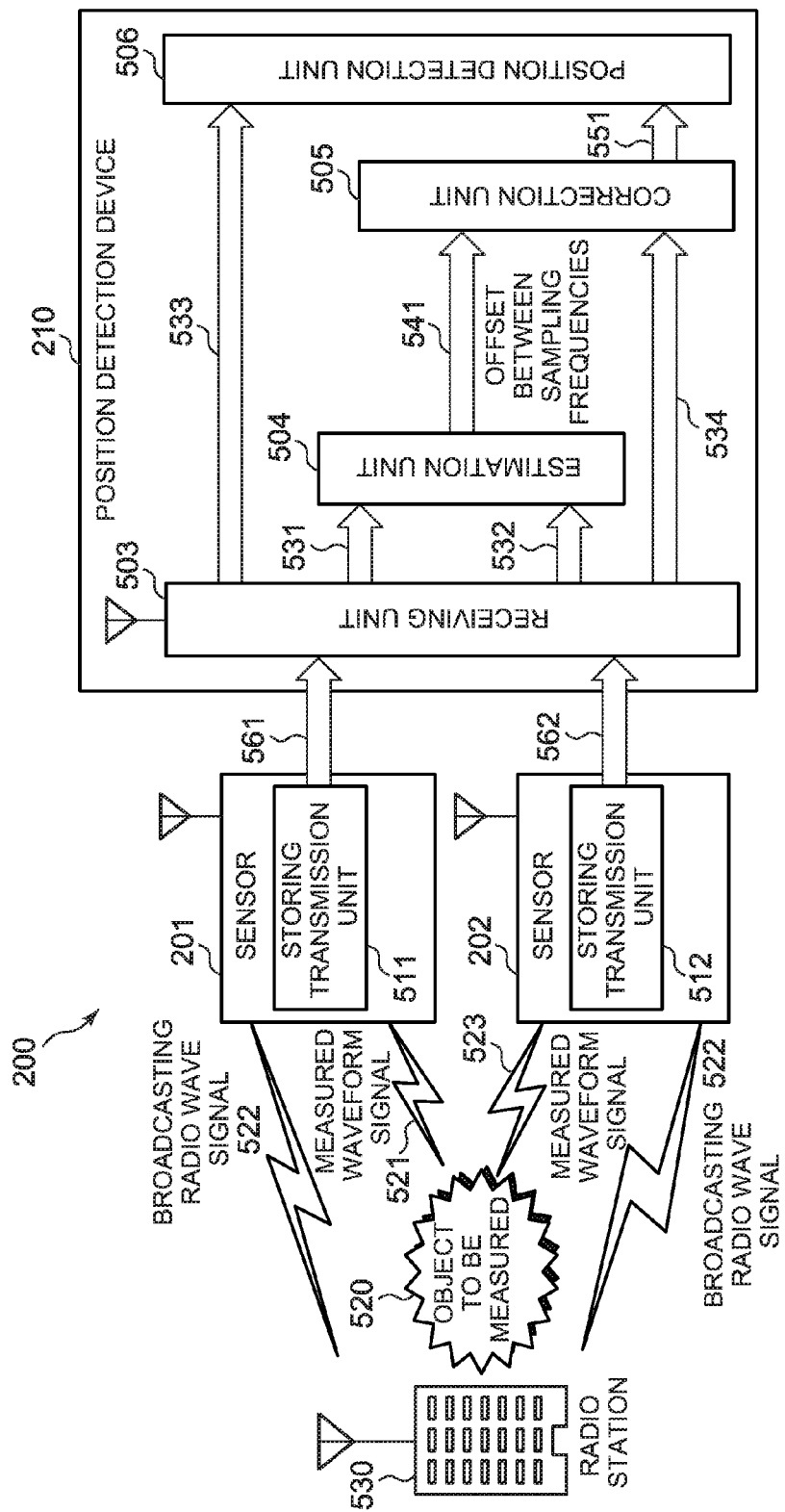
FIG. 5 is a diagram illustrating the configuration of the position detection system according to embodiments of the present disclosure.

FIG. 5 is a block diagram illustrating the detailed configuration of a position detection system 200 according to embodiments of the present disclosure. As illustrated in FIG. 5, the position detection system 200 may include at least two sensors 201, 202, and the position detection device 210.

The sensor 201 may include a storing/transmission unit 511 that receives a measured waveform signal 521 sent out from an object to be measured 520 and a broadcasting radio wave signal 522 sent out from a radio station 530. The storing/transmission unit 511 may store and transmit the measured waveform signal 521 and the broadcasting radio wave signal 522.

The sensor 202 may include a storing/transmission unit 512 that receives a measured waveform signal 523 sent out from the object to be measured 520 and a broadcasting radio wave signal 522 sent out from the radio station 530. The storing/transmission unit 512 may store and transmit the measured waveform signal 523 and the broadcasting radio wave signal 522.

In some aspects, each of these sensors 201 and 202 may record the signals using two or more channels. One channel may be assigned for recording radio wave signals such as radio broadcasting waves, and the other may be assigned for recording measured waveform data. The start and end of recording by each sensor may be controlled or the recording may be made continuously.

The position detection device 210 may include a receiving unit 503, an estimation unit 504, a correction unit 505, and a position detection unit 506.

In the case of detecting the position of an object to be measured using the derivation between sounds detected by the sensors 201 and 202, it may become important to synchronize the clocks of the sensors 201 and 202. In the case of synchronizing two clocks which are in different places, on the msec or μsec time scale, a high precision clock output unit or a receiving unit for receiving the reference signal of a radio wave clock may be installed in each of the sensors 201 and 202. In this case, however, the production efficiency of sensors may be lowered. Therefore, if many sensors are used in a position detection system, the high cost of the system may become problematic. In some aspects, because places where the reference signal of the radio wave clock can be received are largely limited, positions where a sensor can be installed may be limited. Therefore, a broadcasting radio wave signal may be used as a reference signal for synchronizing the clocks of the sensors in this example. Because a broadcasting radio receiving unit is very inexpensive, the production efficiency of sensors is not largely influenced. In some aspects, the broadcasting radio wave signal may be carried by any of an AM broadcasting wave, an FM broadcasting wave, a long wave, and a short wave as long as it is a broadcasting radio wave. Because the broadcasting radio wave receiving unit is inexpensive, and because the power of the broadcasting radio wave signal is strong, the broadcasting radio wave signal may be easily received even under the ground. The broadcasting radio wave signal may be carried by a public radio wave or by a private radio wave.

In this example, the sensor 201 may synthesize the broadcasting radio wave signal 522 and the measured waveform signal 521, and the sensor 202 may synthesize the broadcasting radio wave signal 522 and the measured waveform signal 523. In some aspects, the sensors 201 and 202 may transmit the synthesized signals to the position detection device 210. In some aspects, the correction of the clock is not performed in each sensor, and correction for synchronizing the clocks may be performed in the position detection device 210 which is configured to collect information. The position detection device 210 may obtain correction information by receiving a radio wave that is faster than a sound wave in order to perform the correction. In the case of using a radio wave signal, a time period for the radio wave signal to be demodulated may be shorter and within a certain range.

The position detection device 210 (the analysis side) may receive the measured waveform signals, and generate waveforms by demodulating the received signals. In some aspects, the position detection device 210 may correct the times of the respective clocks of sensors 201 and 202 so that broadcasting radio wave signals 531 and 532 coincide with each other. As correction of waveform data, the correction of two kinds of derivations, that is, a delay and an expansion/contraction (an offset between the sampling frequencies) may be performed. The amount of the expansion/contraction may be obtained by measuring the delays of two sensors. The expansion/contraction may be generated owing to the individual difference between the sensors. In other words, the expansion/contraction may be generated owing to the slight difference between the clock frequencies of the radio receivers. It may be thought that the derivation between the clock frequencies reaches several tenths of one % owing to the individual difference between the clocks of the radio receivers. For example, if one sampling frequency is 8 kHz, other sampling frequency may become about 8001 Hz. In such a case, if measurement lasts one hour or more (such as measurement for obtaining a correlation), there may arise a problem (for example, a problem in that one second derivation may be generated between the signals in measurement that lasts 8,000 seconds). For example, in order to detect a very small sound (for example, a sound of water leakage, or a sign of presence of a person), there may be a case to continue to collect correlation data for about one hour. In this case, an expansion/contraction error owing to the individual difference between sensors may have a great influence. Therefore, it may become necessary to match the pitches of the expansions/contractions of sampling frequencies. For example, in the case of water leakage detection, the presence or absence of the water leakage and the position of the water leakage may be estimated from the cross-correlation function between two signals. If there is an offset (a derivation) between the samplings of the two signals, a correct cross-correlation function is not calculated. If the sampling frequencies are equal to each other, and there is a difference between the times, correction may be easily performed. However, if the sampling frequencies are different from each other, the estimation is not correctly performed owing to a trouble that the cross-correlation function becomes very small or the like.

In some aspects, the position detection device 210 may include the receiving unit 503, the estimation unit 504, the correction unit 505, and the position detection unit 506, and correct the derivations between the clocks (the times and sampling frequencies) at the time when correlation analysis is performed on the plural waveforms of sounds or vibrations.

The receiving unit 503 may receive the signals 561 and 562 transmitted from the storing/transmission units 511 and 512, respectively, and separate the received signals, for each sensor which transmits at least one of the received signals, into a broadcasting radio wave signal 531 and a measured waveform signal 533, and a broadcasting radio wave signal 532 and a measured waveform signal 534.

The estimation unit 504 may estimate an offset 541 between the sampling frequencies of the measured waveform signal 533 from the sensor 201 and the measured waveform signal 534 from the sensor 202 on the basis of the broadcasting radio wave signals 531 and 532 respectively received from the sensors 201 and 202.

The correction unit 505 may correct the measured waveform signal 534 separated from the received signal 562 transmitted from the sensor 202 on the basis of the estimated offset 541 between the sampling frequencies.

The position detection unit 506 may detect the position of the object to be measured 520 on the basis of the measured waveform signal 533 from the sensor 201, and a signal 551 obtained by the correction unit 505 correcting the measured waveform signal 534 from the sensor 202. The position detection unit 506 may store the measured waveform signals sent from the object to be measured at measurement positions A corresponding to the sensor 201 and B corresponding to the sensor 202, and estimate the position of the object to be measured using a correlation function between the signals obtained at the measurement positions A and B and the sound velocity.

The position detection device 210 may correct the clocks at the time of executing analysis. It does not mean to correct the clocks installed in the sensors 201 and 202 or to install a very precise clocks in each of the sensors. In some aspects, the position detection device 210 may obtain correction information by receiving a radio wave that is much faster than a sound wave in order to perform the correction. The sound velocity is several km/sec, and the light velocity is three hundred thousand km/sec (Light travels 10 km in 33 μsec). The position detection device 210 may receive the same radio waves sent by plural sensors in respective measurement points and extract the information about the derivation between the clocks from the relation between the received signals (usually the correlation between the received signals). The relation between the received signals may be the relation between the received raw signals, or may be the relation between the signals obtained by demodulating the received signals. As described above, if the position detection device 210 is configured in such a way that the clocks are corrected at the time of analysis, the correction of the clocks may be performed even under the ground or in a manhole.

Figure 6:
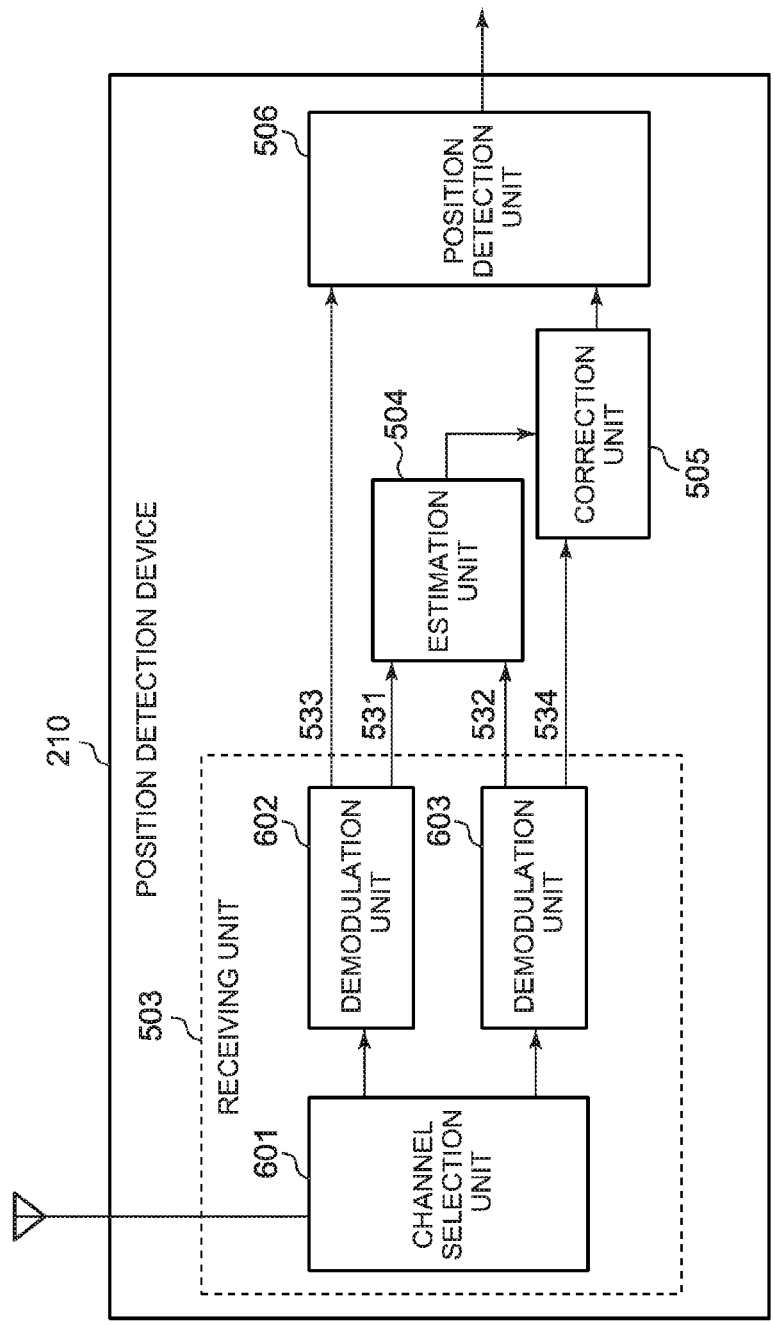
FIG. 6 is a diagram illustrating the configuration of the position detection device according to embodiments of the present disclosure.

FIG. 6 is a block diagram illustrating the detailed configuration of the position detection device 210. The receiving unit 503 may include a channel selection unit 601, and demodulation units 602 and 603. The channel selection unit 601 may receive the signals from the sensors 201 and 202, and select and separate the received signals, for each sensor which transmits at least one of the received signals, into a broadcasting radio wave signal 531 and a measured waveform signal 533, and a broadcasting radio wave signal 532 and a measured waveform signal 534. The demodulation units 602 and 603 may demodulate the separated signals from the sensors, and output the measured waveform signals 533 and 534 and the broadcasting radio wave signals 531 and 532 as reference signals respectively.

The estimation unit 504 may estimate the offset between the sampling frequencies on the basis of the broadcasting radio wave signals 531 and 532. The correction unit 505 may correct the measured waveform signal 534 from the sensor 202 so that the offset between the sampling frequencies estimated by the estimation unit 504 is canceled, and make the sampling frequencies of the measured waveform signals 533 and 534 coincide with each other. For the purpose of the above correction, resampling may be performed. In the above case, the output of one sensor may be corrected. In some aspects, the present disclosure is not limited to this method, and the outputs of both sensors may be corrected. In a case where sensors are installed at three places or more, a method in which the outputs of more than one sensor are corrected may be effective.

Figure 7:
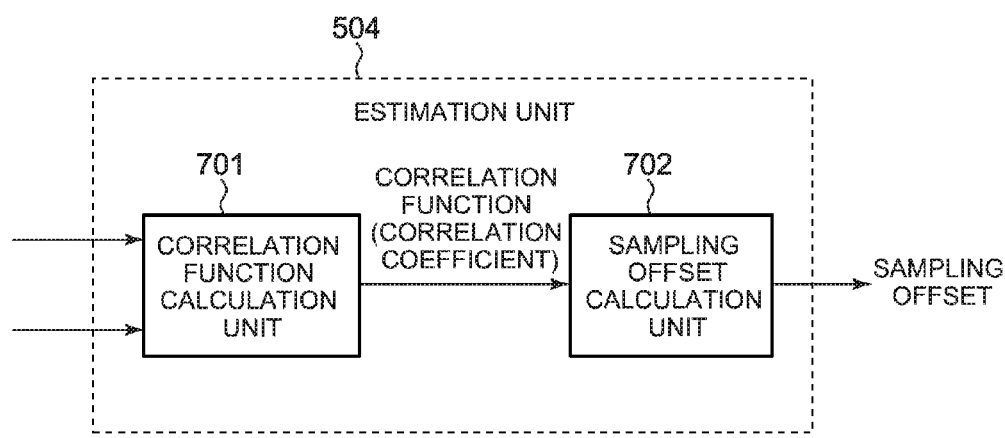
FIG. 7 is a diagram illustrating a configuration of an estimation unit according to embodiments of the present disclosure.

FIG. 7 is a diagram illustrating the detailed configuration of the estimation unit 504. The estimation unit 504 may include a correlation function calculation unit 701 and a sampling offset calculation unit 702.

The correlation function calculation unit 701 may calculate a cross-correlation function (or a cross-correlation coefficient) C(t) between the broadcasting radio wave signals (radio sounds) that are obtained by the two sensor modules as reference signals. For example, the correlation function calculation unit 701 may calculate the C(t) using an equation described below.

$$C(t) = \Sigma x(k) \cdot y(k-t)$$

Figure 8:
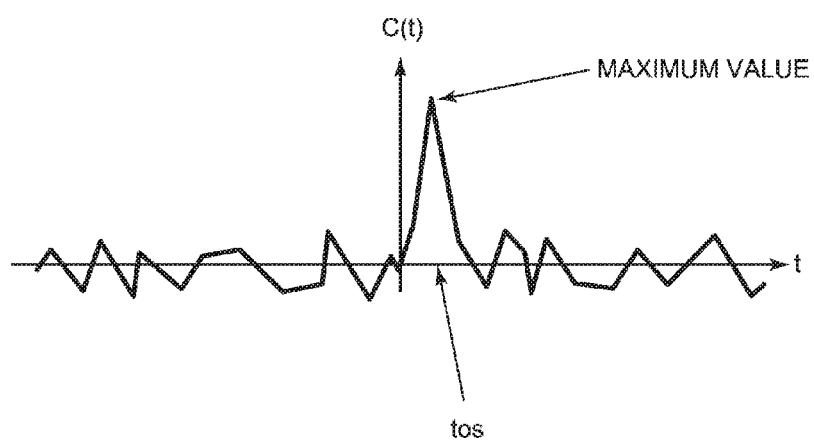
FIG. 8 is a diagram for describing an operation of the estimation unit according to embodiments of the present disclosure.

The sampling offset calculation unit 702 may obtain a time offset difference tos (Offset Time) that makes the value of the correlation function calculated by the cross-correlation calculation unit 701 the maximum or that makes the absolute value of the correlation function the maximum (Refer to FIG. 8). If there is no offset between the sampling frequencies, tos=0. The tos may be obtained with a time interval smaller than the sampling interval using interpolation. The obtained tos may be information regarding time. In a case where the reference signals may be always obtained, the sampling offset calculation unit 702 may always keep calculating of tos.

In a case where the reference signals are not always obtained, so that tos can be obtained sometimes, the sampling offset calculation unit 702 may use linear interpolation regarding a time interval. For example, in a case where a sampling time difference at the time T1 is tos1 and a sampling time difference at the time T2 is tos2, a sampling time difference tos3 at the time T3 (T1<T3<T2) may be calculated by the following expression.

$$tos3 = \{(T3-T1)tos2 + (T2-T3)tos1\}/\{T2-T1\}$$

In a case where the reference signals are not always obtained, so that tos can be obtained sometimes, a sampling time difference is not calculated at each sampling point, but the sampling time difference may be calculated as a sampling frequency difference. For example, in a case where a sampling time difference at the time T1 is tos1 and a sampling time difference at the time T2 is tos2, a sampling frequency fos between the time T1 and the time T2 may be obtained by the following expression relative to the sampling frequency of the reference signal fs0.

$$fos = \{(T2+tos2)-(T1+tos1)\}/\{T2-T1\}$$

In some aspects, more advanced interpolation may be used.

The sampling offset calculation unit 702 may calculate a sampling number (Sample Index) that indicates the offset (derivation) between the sampling frequencies.

In some aspects, because the clock generation unit that causes a sampling derivation to be generated is influenced by temperature and the like, the sampling offset calculation unit 702 may calculate the sampling offset (derivation) may be calculated using information about temperature and the like. In some aspects, each sensor may further include a temperature measurement unit that measures the temperature of the sensor, and store and transmit the temperature. In this case, the cross-correlation function calculation unit 701 may further derive a correlation function having temperatures that are measured by individual sensors as variables, and estimate an offset between the sampling frequencies on the basis of the derived cross-correlation function and the values of actual temperatures. Even if sampling time derivations can be obtained sometimes, more precise correction may be performed by performing correction by temperature.

The correction unit 505 may calculate sampling values that are corrected in consideration of sampling offsets. There may be plural calculation methods such as a method in which the most neighboring sampling value is obtained as a corrected sampling value, a method in which a corrected sampling value is obtained by carrying out interpolation using the two most neighboring sampling values, a method in which a corrected sampling value is obtained by carrying out interpolation using three or more neighboring sampling values, and the like.

Figure 9:
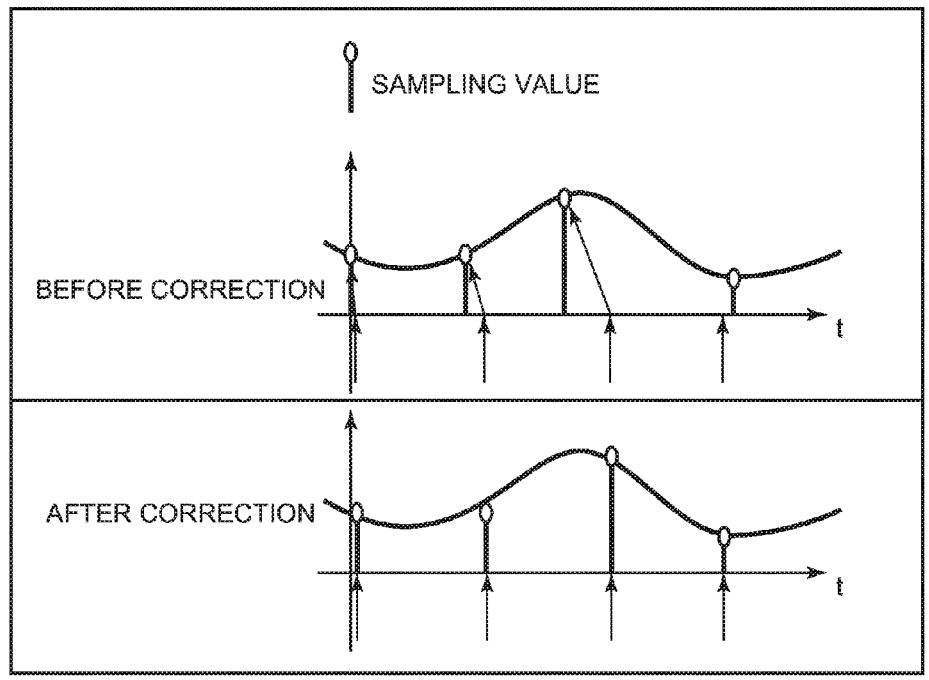
FIG. 9 is a diagram for describing an operation of a correction unit according to embodiments of the present disclosure.

FIG. 9 is a diagram for describing a method in which the most neighboring sampling value is obtained as a corrected sampling value. An outline oval indicates a sampling value, and an intersection point of a line segment under the outline oval with a time axis indicates a time at which the sampling value is obtained. A sampling data at a time which differs from the above-described time may be generated in order to perform correction on this data using the sampling data. An upward arrow indicates a time at which a sampling is performed. As a sampling value corrected in consideration of the sampling offset, a sampling value at a sampling time which is the nearest to a sampling time to be used after the correction may be adopted. In a case where an allowable sampling time difference is 0.5 sample interval or more, the above method may be used. There may be many cases where this method is useful if the sampling frequency is adequately high. Not only a simple time difference but also even the data number of the signal may be gradually corrected in a case where there is a difference between sampling frequencies.

Figure 10:
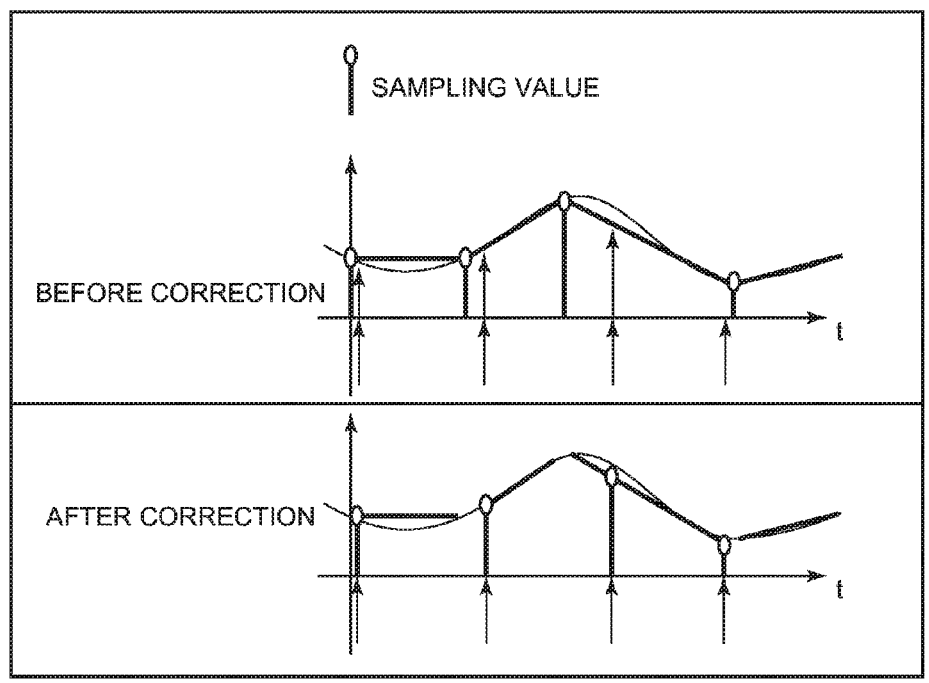
FIG. 10 is a diagram for describing an operation of the correction unit according to embodiments of the present disclosure.
Figure 11:
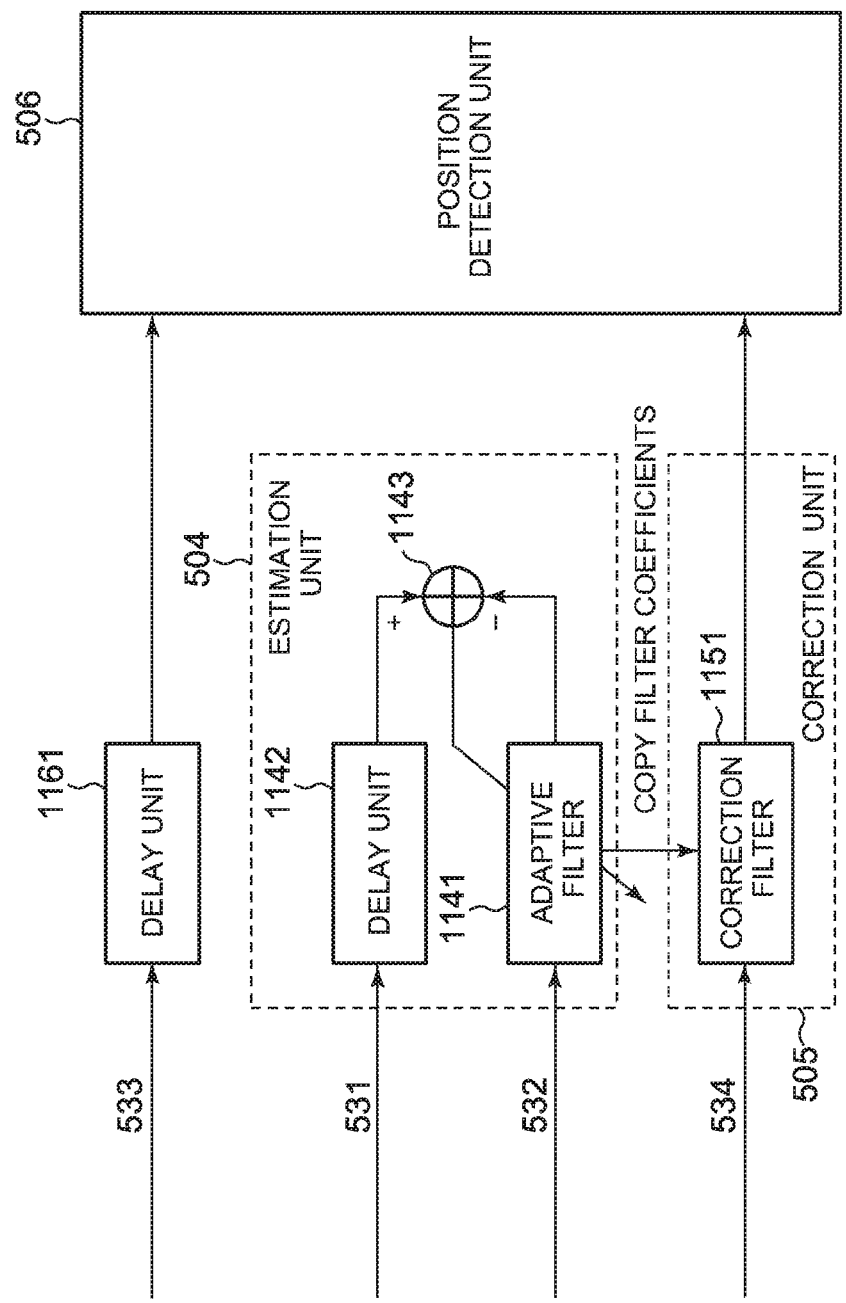
FIG. 11 is a diagram illustrating another example of a configuration of the estimation unit and the correction unit according to embodiments of the present disclosure.

FIG. 10 is a diagram for describing a method in which a corrected sampling value is obtained by carrying out interpolation using sampling values at two neighboring points. A sampling value corresponding to a sampling point represented by an arrow may be obtained by interpolation through dividing proportionally using two neighboring points. After a line segment is drawn by connecting two sampling values, which are the nearest to a sampling time to be used after the correction, a value on this line segment at the sampling time to be used after the correction may be adopted as a sampling value at the sampling time to be used after the correction. A value obtained in this method may be nearer to a real value than a value obtained using the most nearest one point. It may improve the performance of analysis.

In some aspects, there may be an interpolation method in which three or more neighboring sampling points are used (Refer to Japanese Unexamined Patent Application Publication No. Hei 06-204798).

Sampling frequency conversion may be performed, for example, using data between times at which sampling time differences can be estimated (Refer to WO Publication 2011/090110A1, "Sampling Rate Conversion Device, and Sampling Rate Conversion Method", Mitsubishi Electric Corporation).

In a case where the reference signals can always be obtained, the estimation unit 504 may estimate an offset between the sampling frequencies using an adaptive filter 1141. In this case, the correction unit 505 may correct the measured waveform signal 534 from the sensor 202 using a correction filter 1151, and make the respective sampling frequencies of the measured waveform signals 533 and 534 coincide with each other. An offset between the sampling frequencies may be represented by the coefficients of the adaptive filter 1141. In order to match the timings, delay units 1161 and 1142 may be installed. The coefficients of the adaptive filter may be used for a filter for correction. A subtracter 1143 may subtract the output signal of the adaptive filter 1141 from a signal obtained by delaying the reference signal 531. The adaptive filter 1141 may be a filter (typically an FIR filter) into which the reference signal 532 is input, and control the filter coefficients of its own so that the output of the subtracter 1143 becomes minimum.

That the subtraction result becomes minimum may mean that the sampling offset becomes very small at the input and output of the subtracter 1143. If the coefficients of the adaptive filter 1141 are copied and the copied coefficients are used in the correction filter 1151 for the measured waveform signal 534, a signal in which the sampling offset is canceled may be obtained.

According to this example, because the sampling is corrected at each point, time correction can be performed with precision needed by correlation processing and synchronous addition executed by an array. Precise sampling synchronization needed by adaptive filtering, adaptive array processing, and the like can be performed. Because broadcasting radio waves are used, each sensor module can be very simply configured. Because a delay and an offset between the sampling frequencies are corrected at the side of the position detection device 210, clock accuracy is not required for each sensor.

Third Example

Figure 12:
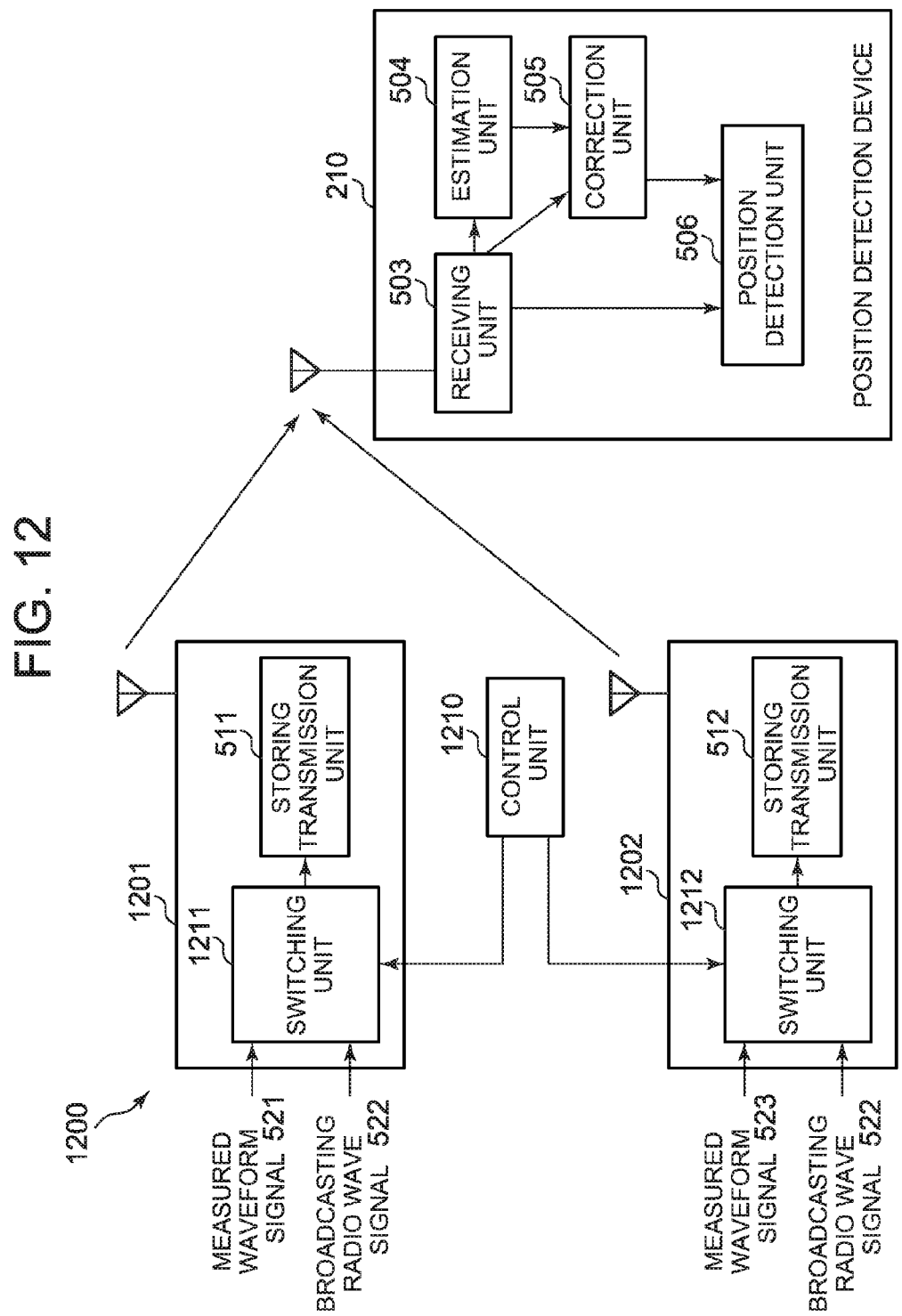
FIG. 12 is a diagram illustrating the configuration of a position detection system according to embodiments of the present disclosure.

A position detection system 1200 according to a third example of the present disclosure will be described with reference to FIG. 12. FIG. 12 is a diagram for describing the configuration of the position detection system according to embodiments of the present disclosure. In comparison with the above-described second example, the position detection system according to this example may be different in that it includes a control unit 1210, and sensors 1201 and 1202 include switching units 1211 and 1221 respectively. Because other components and their operations of this example are the same as those of the second example, the same components and the same operations are given the same reference symbols.

A storing/transmission unit 511 may record using one channel. The storing/transmission unit 511 may store the broadcasting radio wave signal 522 before or after a measured waveform signal 521. The broadcasting radio wave signal 522 may be stored before or after the measured waveform signal 521, or may be stored both before and after the measured waveform signal 521. The storing/transmission unit 511 may switch between the data to be stored (the measured waveform signal 521 and the broadcasting radio wave signal 522) according to instructions of the control unit 1210.

The control unit 1210 may be installed in any of the sensors, or can be installed in a position detection device 210. The control of the control unit 1210 may be performed via a radio wave, a sound wave, or the like. Rough switching times may be set in advance by timers installed in the sensors 1201 and 1202. The position detection device 210 may be configured not to use data obtained just before or just after the switching times.

According to this example, the amount of data transmitted from each of the sensors to the position detection device 210 can be reduced.

Fourth Example

Figure 13:
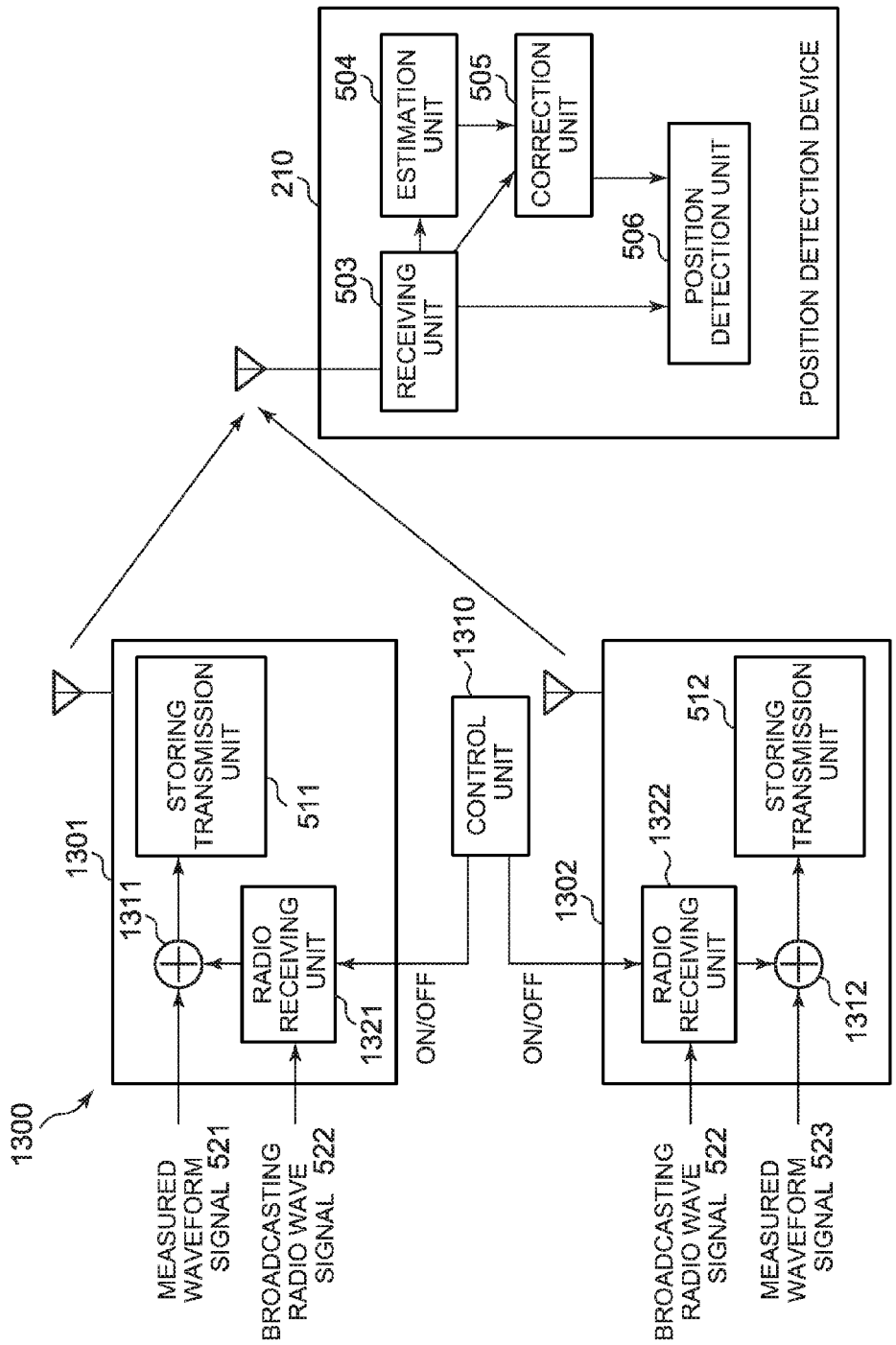
FIG. 13 is a diagram illustrating the configuration of a position detection system according to embodiments of the present disclosure.

A position detection system 1300 according to a fourth example will be described with reference to FIG. 13. FIG. 13 is a diagram for describing the configuration of the position detection system according to embodiments of the present disclosure. In comparison with the above-described second example, the position detection system 1300 according to this example may be different in that it includes a control unit 1310, and that individual sensors 1301 and 1302 include radio receiving units 1321 and 1322 and adders 1311 and 1312 respectively. Because other components and their operations of this example are the same as those of the second example, the same components and the same operations are given the same reference symbols.

In this example, a storing/transmission unit 511 may record using one channel. The storing/transmission unit 511 may record the radio wave signal such as a radio signal, and record (e.g., superimpose) the radio wave signal before or after a measured waveform signal. The control unit 1310 may transform a special control sound into a radio wave, and transmit the radio wave to the sensors 1301 and 1302 to control the receiving timing and the superimposing timing of the radio wave signal. An example of the special control sound may include a combination of plural tone burst signals used in telephony system, a pulse signal, a Morse code signal, a time annunciation signal, or the like. A position detection device 210 does not use a part of data superimposed onto the measured waveform signal.

According to this example, the amount of data transmitted from each of the sensors to the position detection device 210 can be reduced.

Fifth Example

Figure 14:
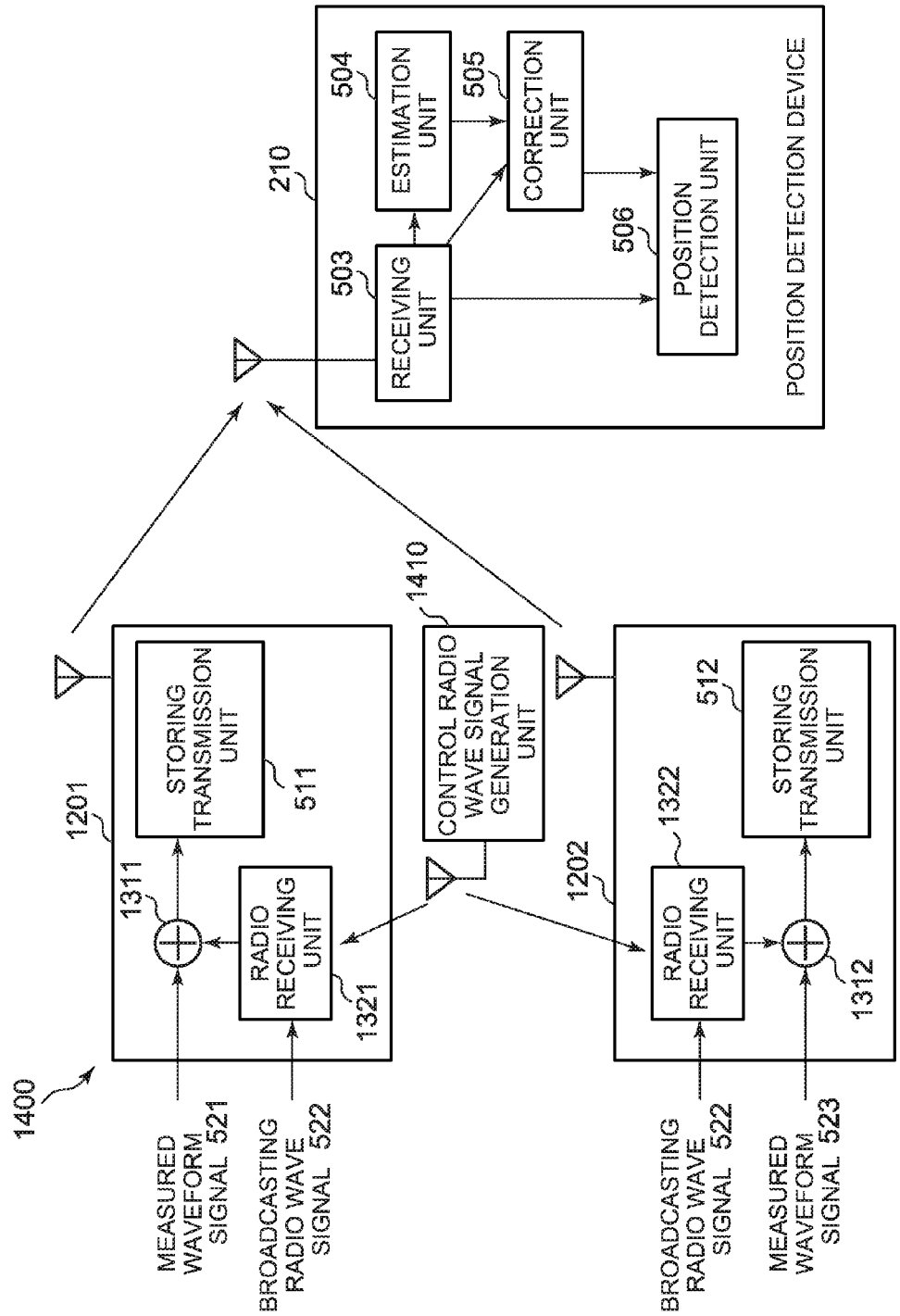
FIG. 14 is a diagram illustrating the configuration of a position detection system according to embodiments of the present disclosure.

A position detection system 1400 according to a fifth example will be described with reference to FIG. 14. FIG. 14 is a diagram for describing the configuration of the position detection system according to embodiments of the present disclosure. In comparison with the above-described fourth example, the position detection system according to this example may be different in that it includes a control radio wave signal generation unit 1410 instead of the control unit 1310. In comparison with the above-described fourth example, the position detection system according to this example may be different in that a radio receiving unit 1321 of a sensor 1301 and a radio receiving unit 1322 of a sensor 1302 receive control signals from the control radio wave signal generation unit 1410. Because other components and their operations of this example are the same as those of the fourth example, the same components and the same operations are given the same reference symbols.

According to this example, the amount of data transmitted from each of the sensors to a position detection device 210 can be reduced.

Sixth Example

Figure 15:
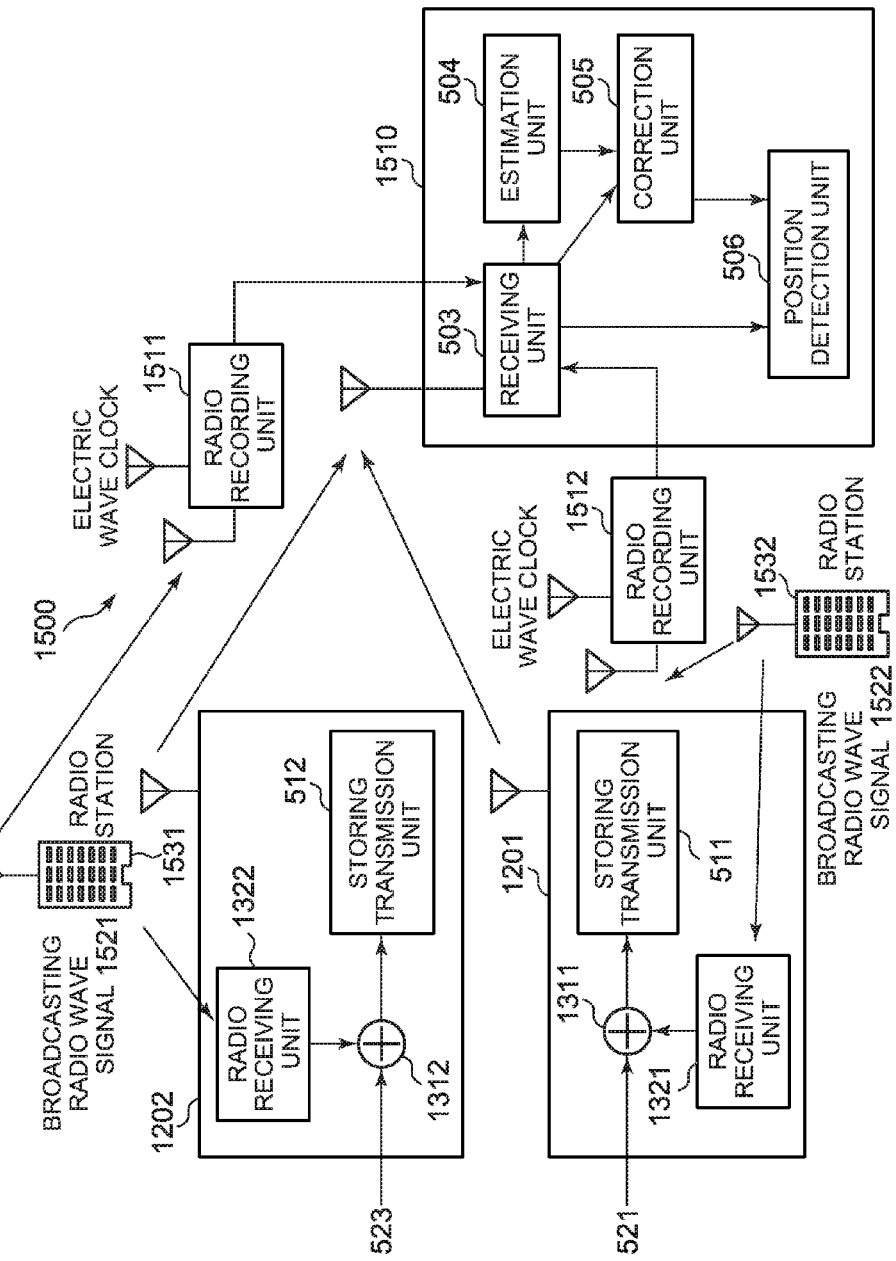
FIG. 15 is a diagram illustrating the configuration of a position detection system according to embodiments of the present disclosure.

A position detection system according to a sixth example will be described with reference to FIG. 15. FIG. 15 is a diagram for describing the configuration of the position detection system according to embodiments of the present disclosure. In comparison with the above-described second example, the position detection system 1500 according to this example may be different in that radio receiving units 1321 and 1322 respectively receive broadcasting radio wave signals 1521 and 1522 sent out from radio stations 1531 and 1532 which are different from each other. In some aspects, the position detection system 1500 according to this example may be different in that a position detection device 1510 is coupled with radio recording units 1511 and 1512 each of which includes a radio wave clock (or a global positioning system). Because other components and their operations of this example are the same as those of the second example, the same components and the same operations are given the same reference symbols.

In this example, there may be an intention to make it possible that the correction of clocks is performed even in a case where plural sensors cannot receive the same broadcasting radio wave signal. For example, a case where a sensor 1201 and a sensor 1202 are disposed far apart from each other can be taken up. If the position detection device 1510 records information for correcting time from the radio recording units 1511 and 1512, an absolute time can be corrected.

Disclosed "units" and "sections" may be implemented as hardware elements, software elements, or a combination of the two. For example, "units" and "sections" may be hardware processors (e.g., application specific integrated circuits (ASICs), field programmable gate arrays (FPGAs), Systems on a Chip (SoCs)). Units and sections may be combined into a single hardware element, or divided across multiple elements. In other embodiments, "units" and "sections" may be implemented as software, such as digitized instructions that are performed by a hardware processor or virtualized environment.

Other Examples

Although the present disclosure has been described with reference to some examples, the present disclosure is not limited to the above-described examples. It is apparent that various alterations or modifications that may be understood by those skilled in the art can be made to the configuration and the detail of the present disclosure within the scope of the present disclosure. Furthermore, it is also to be understood that a system or a device including various combinations of individual features included in the above-described examples falls within the scope of the present disclosure.

In addition, the present disclosure may be applied to a system including plural instruments, or to a stand-alone device. Furthermore, the present disclosure can be applied to a system or a device even in a case where an information processing program that realizes the functions of the above examples are supplied to the system or the device directly or remotely. Therefore, a program installed in a computer in order to realize the functions of the present disclosure, a medium which stores the above program, and a WWW (World Wide Web) server from which the program is downloaded fall within the scope of the present disclosure. Especially, at least a non-transitory computer-readable medium, which stores a program that makes a computer execute process steps included in the above-described examples, falls within the scope of the present disclosure.

The invention claimed is:

1. A position detection system comprising:
a first sensor and a second sensor each of which includes
a first memory storing instructions; and
at least one first processor configured to process the instructions to:
receive a broadcasting radio wave signal and a measured waveform signal sent out from an object to be measured, and
store and transmit the broadcasting radio wave signal and the measured waveform signal; and
a position detection apparatus which includes
a second memory storing instructions; and
at least one second processor configured to process the instructions to:
receive the broadcasting radio wave signal and the measured waveform signal transmitted from the first sensor and the second sensor,
separate the broadcasting radio wave signal and the measured waveform signal, for each of the first sensor and the second sensor,
estimate an offset between sampling frequencies of the measured waveform signal of the first sensor and the measured waveform signal of the second sensor based on the broadcasting radio wave signals respectively received by the first sensor and the second sensor,
correct the measured waveform signal transmitted from the second sensor based on the estimated offset between the sampling frequencies, and
detect the position of the object to be measured based on the measured waveform signal transmitted from the first sensor and a signal obtained by correcting the measured waveform signal transmitted from the second sensor.

2. The position detection system according to claim 1, wherein the broadcasting radio wave signal is a public radio broadcasting wave.

3. The position detection system according to claim 1, wherein the at least one second processor is further configured to process the instructions to:
calculate a correlation function between the broadcasting radio wave signals received by the first sensor and the second sensor, and
calculate a time difference that makes the correlation function between the broadcasting radio wave signals received by the first sensor and the second sensor the maximum.

4. The position detection system according to claim 3, wherein the at least one second processor is further configured to process the instructions to:
interpolate the time difference during an interval between the receiving timings of the broadcasting radio wave signals.

5. The position detection system according to claim 1, wherein the at least one second processor is further configured to process the instructions to:
calculate a correlation function between the broadcasting radio wave signals received by the first sensor and the second sensor, and
calculate an offset between the sampling frequencies that makes the correlation function between the broadcasting radio wave signals received by the first sensor and the second sensor the maximum.

6. The position detection system according to claim 1, wherein the at least one second processor is further configured to process the instructions to:
calculate a correlation function between the broadcasting radio wave signals received by the first sensor and the second sensor; and
calculate an offset between the sampling frequencies that makes the correlation function between the broadcasting radio wave signals received by the first sensor and the second sensor the maximum as a sampling number.

7. The position detection system according to claim 1, wherein the at least one first processor is further configured to process the instructions to:
measure the temperature of each sensor, and
store and transmit the temperature, and
wherein the at least one second processor is further configured to process the instructions to:
estimate the offset between the sampling frequencies based on the temperatures measured by the first sensor and the second sensor.

8. The position detection system according to claim 1, wherein the at least one second processor is further configured to process the instructions to:
delay the broadcasting radio wave signal received from the first sensor,
input the broadcasting radio wave signal received from the second sensor,
sequentially control coefficients of an adaptive filter so that the difference between the delayed broadcasting radio wave signal and the input broadcasting radio wave signal becomes smaller than a predetermined threshold, and
correct the measured waveform signal from the second sensor using the sequentially controlled coefficients.

9. The position detection system according to claim 1, wherein the at least one first processor is further configured to process the instructions to:
store the measured waveform signals and the broadcasting radio wave signals in a time-division storing mode by switching the measured waveform signals and the broadcasting radio wave signals.

10. The position detection system according to claim 1, wherein the at least one second processor is further configured to process the instructions to:
store the measured waveform signals and the broadcasting radio wave signals in a superimposed storing mode.

11. The position detection system according to claim 10, wherein the at least one second processor is further configured to process the instructions to:
control the timing of superimposing storing based on distinctive signals included in the broadcasting radio wave signals.

12. A position detection system, comprising:
a memory storing instructions; and
at least one processor configured to process the instructions to:
receive measured waveform signals sent out from an object to be measured via a first sensor and a second sensor,
receive broadcasting radio wave signals sent out from the first sensor and the second sensor,
separate the measured waveform signals and the broadcasting radio wave signals, for each sensor,
estimate an offset between sampling frequencies of the measured waveform signal of the first sensor and the measured waveform signal of the second sensor based on the broadcasting radio wave signals respectively sent out from the first sensor and the second sensor,
correct the measured waveform signal sent out from the second sensor based on the estimated offset between the sampling frequencies, and
detect a position of the object to be measured based on the measured waveform signal sent out from the first sensor and a signal obtained by correcting the measured waveform signal sent out from the second sensor.

13. A position detection method, comprising:
receiving measured waveform signals sent out from an object to be measured via a first sensor and a second sensor;
receiving broadcasting radio wave signals sent out from the first sensor and the second sensor;
separating the measured waveform signals and the broadcasting radio wave signals, for each sensor;
estimating an offset between sampling frequencies of the measured waveform signal of the first sensor and the measured waveform signal of the second sensor based on the broadcasting radio wave signals respectively sent out from the first sensor and the second sensor;
correcting the measured waveform signal sent out from the second sensor based on the estimated offset between the sampling frequencies; and
detecting a position of the object to be measured based on the measured waveform signal sent out from the first sensor and a signal obtained by correcting the measured waveform signal sent out from the second sensor.

14. A non-transitory computer-readable storage medium may store instructions that when executed by a computer enable the computer to implement a method comprising:
receiving measured waveform signals sent out from an object to be measured via a first sensor and a second sensor;
receiving the broadcasting radio wave signals sent out from the first sensor and the second sensor;
separating the measured waveform signals and the broadcasting radio wave signals, for each sensor;
estimating an offset between sampling frequencies of the measured waveform signal of the first sensor and the measured waveform signal of the second sensor based on the broadcasting radio wave signals respectively sent out from the first sensor and the second sensor;
correcting the measured waveform signal sent out from the second sensor based on the estimated offset between the sampling frequencies; and
detecting a position of the object to be measured based on the measured waveform signal sent out from the first sensor and a signal obtained by correcting the measured waveform signal sent out from the second sensor.

* * * * *